United States Patent
Matuoka et al.

[11] Patent Number: 5,814,283
[45] Date of Patent: Sep. 29, 1998

[54] EXHAUST PURIFIER OF INTERNAL COMBUSTION ENGINE

[75] Inventors: Hiroki Matuoka; Masaaki Tanaka, both of Susono; Shigemitu Iisaka, Suntou-gun; Michio Furuhashi, Mishima; Toshinari Nagai, Suntou-gun; Tadayuki Nagai, Gotenba; Takashi Kawai; Kenji Harima, both of Susono; Yuuichi Gotou, Susono, all of Japan

[73] Assignee: Toyota Jidosha Kabushiki Kaisha, Aichi, Japan

[21] Appl. No.: 744,229

[22] Filed: Nov. 5, 1996

[30] Foreign Application Priority Data

Nov. 9, 1995 [JP] Japan .................................. 7-291389

[51] Int. Cl.$^6$ .............................. F01N 3/22; B01D 53/34; G05D 7/00
[52] U.S. Cl. ...................... 422/172; 422/171; 422/174; 422/177; 422/199; 422/110; 60/289; 60/300; 60/306
[58] Field of Search .................................. 422/171, 177, 422/172, 110, 174, 180, 211, 199, 222; 60/299, 300, 289, 306; 55/DIG. 30

[56] References Cited

U.S. PATENT DOCUMENTS 4,125,997  11/1978  Abthoff et al. .......................... 60/289
5,456,063  10/1995  Yoshizaki et al. ....................... 60/300

FOREIGN PATENT DOCUMENTS 629771    12/1994  European Pat. Off. ................. 60/306
62-124259  8/1987  Japan .
6-74028    3/1994  Japan .
6-212959   8/1994  Japan .

*Primary Examiner*—Hien Tran
*Attorney, Agent, or Firm*—Kenyon & Kenyon

[57] ABSTRACT

An exhaust purifier of an internal combustion engine supplies secondary air into an exhaust pipe without cooling nor inactivating an electrically heated catalyst (EHC) that is active. The exhaust purifier includes the EHC 3 disposed in the exhaust pipe 2, a main catalyst 4 disposed in the exhaust pipe 2 downstream from the EHC 3, and a unit for supplying secondary air into the exhaust pipe 2. The secondary air supply unit has a main path 10 for supplying secondary air into a space defined in the exhaust pipe 2 between the EHC 3 and the main catalyst 4 when it is determined that the main catalyst 4 is active. The secondary air supply unit may additionally have a second path 9 for supplying secondary air into the exhaust pipe 2 on the upstream side of the EHC 3 when it is determined that the EHC 3 is active, so that the secondary air may pass through the EHC 3 and reach the main catalyst 4.

14 Claims, 5 Drawing Sheets

Fig. 5

| INPUT/OUTPUT | PRESENT INVENTION | | | PRIOR ART |
| --- | --- | --- | --- | --- |
| | (i) | (ii) | (iii) | |
| EHC | INACTIVE | ACTIVE | ACTIVE | — |
| MAIN CATALYST | INACTIVE | INACTIVE | ACTIVE | — |
| SECOND VALVE | CLOSE | OPEN | OPEN | OPEN |
| MAIN VALVE | CLOSE | CLOSE | OPEN | — |
| AIR PUMP | STOP | LOW SPEED | HIGH SPEED | HIGH SPEED |

EXHAUST PURIFIER OF INTERNAL COMBUSTION ENGINE

BACKGROUND OF THE INVENTION

1. Field of the Invention

The present invention relates to an exhaust purifier of an internal combustion engine, and particularly, to one having an electrically heated catalyst (EHC) disposed in an exhaust pipe, a main catalyst positioned downstream from the EHC in the exhaust pipe, and a unit for supplying secondary air into the exhaust pipe.

2. Description of the Related Art

An exhaust system of an internal combustion engine has a catalyst for purifying exhaust gas. The catalyst is activated by the heat of the exhaust gas. If the engine is cold when it is started, it takes time to heat the catalyst up to its activation temperature. Until the activation temperature is attained, the catalyst is inactive, and does not purify the exhaust gas. To solve the problem, a prior art system arranges an electrically heated catalyst (EHC) in the exhaust system. When the engine is cold at the start, the catalyst is electrically heated to quickly reach an activation temperature to purify the exhaust gas. It is also known to supply secondary air to the catalyst, to promote oxidation of HC and CO contained in the exhaust gas.

Japanese Unexamined Patent Publication No. 6-74028 discloses an apparatus for supplying secondary air to an EHC of an internal combustion engine. The disclosure intends to quickly heat the EHC when the engine is started from a cold state and reduce power consumption and load on the power source. The apparatus arranges the EHC and a main catalyst in an exhaust system. The apparatus has a heater for heating the EHC and an electric air pump for supplying secondary air to the upstream side of the exhaust system. After the EHC is heated, or after the EHC is activated, or just before the activation of the EHC, the air pump is driven to supply secondary air to the upstream side of the exhaust system to promote the oxidation reaction of the EHC and main catalyst. Once the catalysts are sufficiently heated, the heater is stopped.

This prior art supplies a large quantity of secondary air to both the EHC and main catalyst, and therefore, secondary air may cool and inactivate the activated EHC.

SUMMARY OF THE INVENTION

An object of the present invention is to provide an exhaust purifier of an internal combustion engine capable of quickly heating an electrically heated catalyst (EHC) and supplying secondary air into an exhaust pipe to promote the oxidation reaction of the EHC while keeping the EHC active.

In order to accomplish the object, a first aspect of the present invention provides an exhaust purifier of an internal combustion engine, having an EHC disposed in an exhaust pipe, a main catalyst disposed in the exhaust pipe downstream from the EHC, and a unit for supplying secondary air into the exhaust pipe. The secondary air supply unit has a path for supplying secondary air into a space defined in the exhaust pipe between the EHC and the main catalyst when it is determined that the main catalyst is active.

A second aspect of the present invention provides an exhaust purifier of an internal combustion engine, having an EHC disposed in an exhaust pipe, a main catalyst disposed in the exhaust pipe downstream from the EHC, and a unit for supplying secondary air into the exhaust pipe. The secondary air supply unit has a main path for supplying secondary air into a space defined in the exhaust pipe between the EHC and the main catalyst, and a second path for supplying secondary air into the exhaust pipe on the upstream side of the EHC. When it is determined that the main catalyst is active, secondary air is supplied to the main catalyst through the main path, and when it is determined that the EHC is active, secondary air is supplied to both the EHC and main catalyst through the second path.

BRIEF DESCRIPTION OF THE DRAWINGS

FIG. 5 is a table showing the difference between the second embodiment and a prior art invention.

DESCRIPTION OF THE PREFERRED EMBODIMENTS

Figure 1:
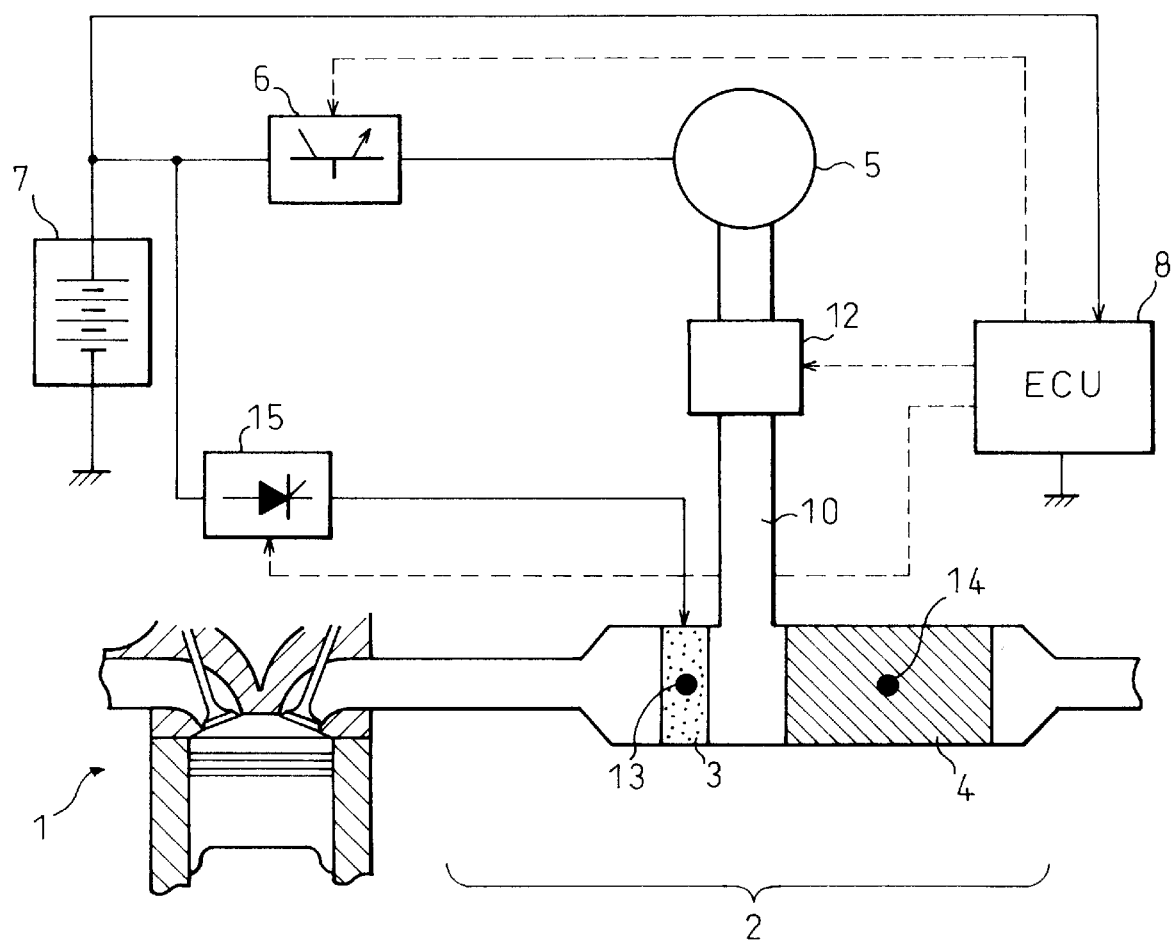
FIG. 1 shows an exhaust purifier according to a first embodiment of the present invention.

FIG. 1 shows an exhaust purifier of an internal combustion engine according to the first embodiment of the present invention. The engine 1 has an exhaust pipe 2 that accommodates an electrically heated catalyst (EHC) 3 and a main catalyst 4, which is downstream from the EHC 3. An air pump 5 supplies secondary air into the exhaust pipe 2. The air pump 5 is connected to a speed controller 6, which is connected to a battery 7. The air pump 5 is an electric air pump incorporating a direct-current (DC) motor. The speed controller 6 has, for example, a transistor for decreasing the voltage of the battery 7, to control the speed of the DC motor. Namely, the speed controller 6 controls the revolution speed of the air pump 5. The speed controller 6 is controlled by electric signals from an electronic control unit 8. A main path 10 connects the air pump 5 to the exhaust pipe 2.

The main path 10 supplies secondary air from the air pump 5 into a space defined in the exhaust pipe 2 between the EHC 3 and the main catalyst 4. The main path 10 has a main valve 12 for passing or shutting off the stream of the secondary air. The main valve 12 is opened when supplying the secondary air into the space and closed when not supplying the same in response to a signal from the control unit 8. The EHC 3 has a temperature sensor 13, and the main catalyst 4 has a temperature sensor 14. The temperature sensors 13 and 14 are connected to the control unit 8 and are used to detect whether or not the catalysts 3 and 4 are active. When the engine 1 is started from a cold state, the control unit 8 turns on a control relay 15 to supply power from the battery 7 to the EHC 3.

The control unit 8 is, for example, a microcomputer consisting of a CPU, a ROM, a RAM, an input interface, an output interface, and a bus line for realizing communication among these components. The control unit 8 controls fuel injection, ignition timing, and according to the present invention, power supply to the EHC 3 and secondary air supply from the air pump 5 into the exhaust pipe 2.

An airflow meter (not shown) is arranged in an intake duct of the engine 1, to provide a voltage signal in proportion to the quantity of intake air. A water temperature sensor (not shown) is arranged on a water jacket of the engine 1, to provide a voltage signal in proportion to a temperature THW of the cooling water of the engine 1. These voltage signals are supplied to the input interface of the control unit 8. A crank angle sensor (not shown) is arranged on a distributor (not shown) of the engine 1, to provide a signal representing the crank angle of the engine 1. The control unit 8 receives this signal through the input interface and calculates the revolution speed NE of the engine 1. The input interface of the control unit 8 also receives the outputs of the temperature sensors 13 and 14 of the EHC 3 and main catalyst 4. The output interface of the control unit 8 provides the relay 15 with a signal to turn on/off the electric power to the EHC 3, and the main valve 12 with a signal to open/close the main path 10. The output interface of the control unit 8 also provides the speed controller 6 with a signal to control the rotation speed of the air pump 5. To turn on/off the air pump 5, this embodiment passes or stops the base current of a transistor of the speed controller 6, and to control the rotation speed of the air pump 5, the embodiment increases or decreases the base current of the transistor. A routine of controlling the exhaust purifier of the first embodiment will be explained.

Figure 2:
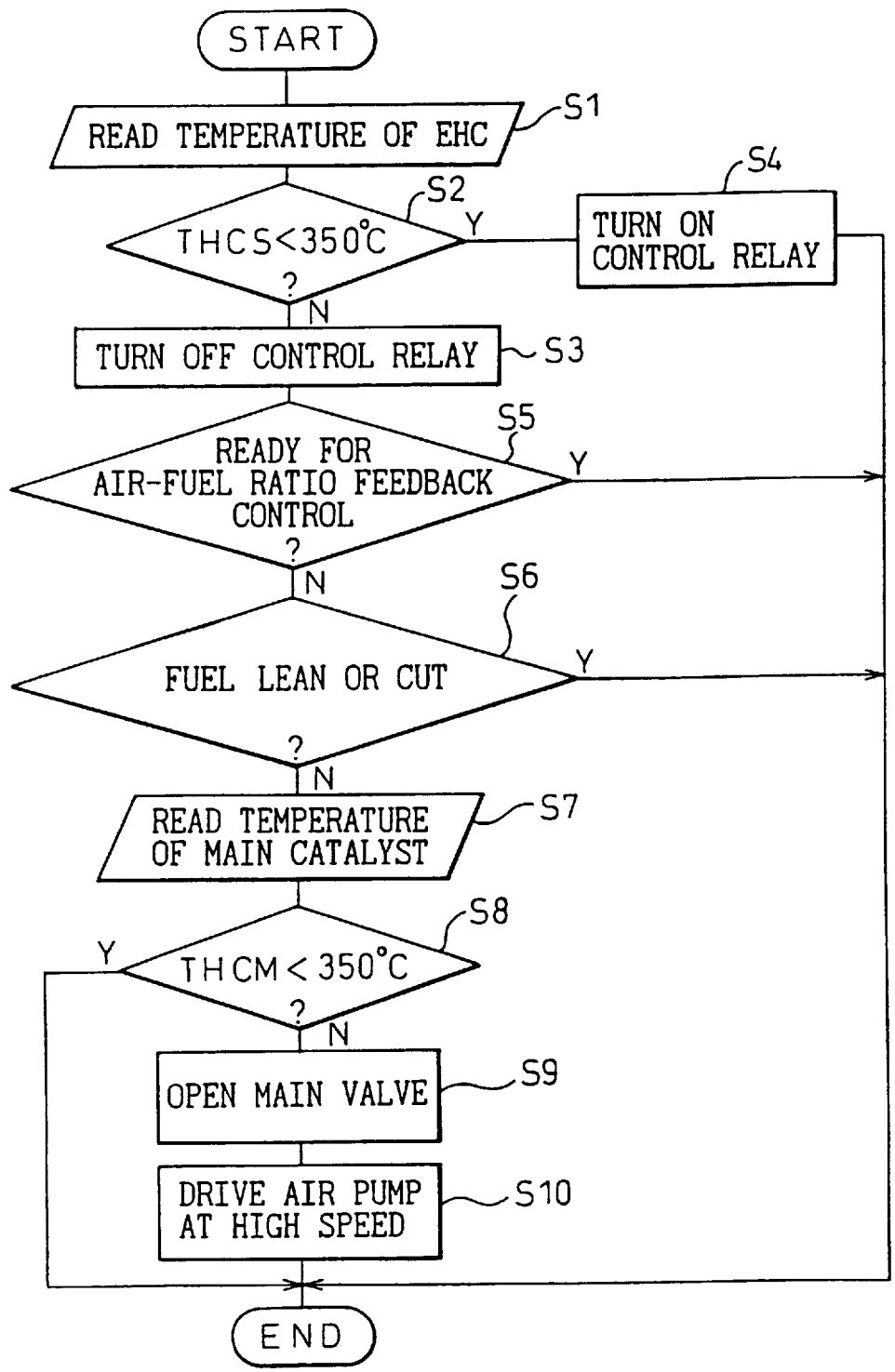
FIG. 2 is a flowchart showing a routine of controlling the exhaust purifier of the first embodiment.

FIG. 2 is a flowchart showing a routine of controlling the exhaust purifier of the first embodiment. This routine is carried out at intervals of 100 ms. Step S1 reads a temperature THCS of the EHC 3 through the temperature sensor 13. Step S2 compares the temperature THCS with the activation temperature of the EHC 3, for example, 350° C. If THCS≧350° C., step S3 is carried out, and if THCS<350° C., step S4 is carried out. Step S3 turns off the control relay 15. Step S4 turns on the control relay 15 to supply power from the battery 7 to the EHC 3.

Step S5 determines whether or not any conditions to start air-fuel ratio feedback control are met. If the feedback control must be started, the routine ends, and if not, step S6 is carried out. More precisely, if any one of the following states is detected, the feedback control will not be started, and therefore, step S5 provides a negative result to terminate the routine:

(a) just started the engine (b) increasing the quantity of fuel injected after the start of the engine (c) increasing the quantity of fuel injected until warming up the engine (d) increasing power to the ECH (e) THW<35° C. where THW is the temperature of the cooling water (f) the air-fuel ratio sensor is inactive.

Step S6 determines whether or not fuel injection to the engine 1 is lean or cut. If fuel injection is lean or cut, the routine ends, and if not, step S7 is carried out. Secondary air must be stopped if the fuel injection is lean or cut, or the quantity of NOx will increase. Step S7 reads a temperature THCM of the main catalyst 4 from the sensor 14. Step S8 compares the temperature THCM with the activation temperature of the main catalyst 4, for example, 350° C. If THCM<350° C., the routine ends, and if THCM≧350° C., step S9 opens the main valve 12. Step S10 drives the air pump 5 at a maximum revolution speed through the speed controller 6.

Figure 3:
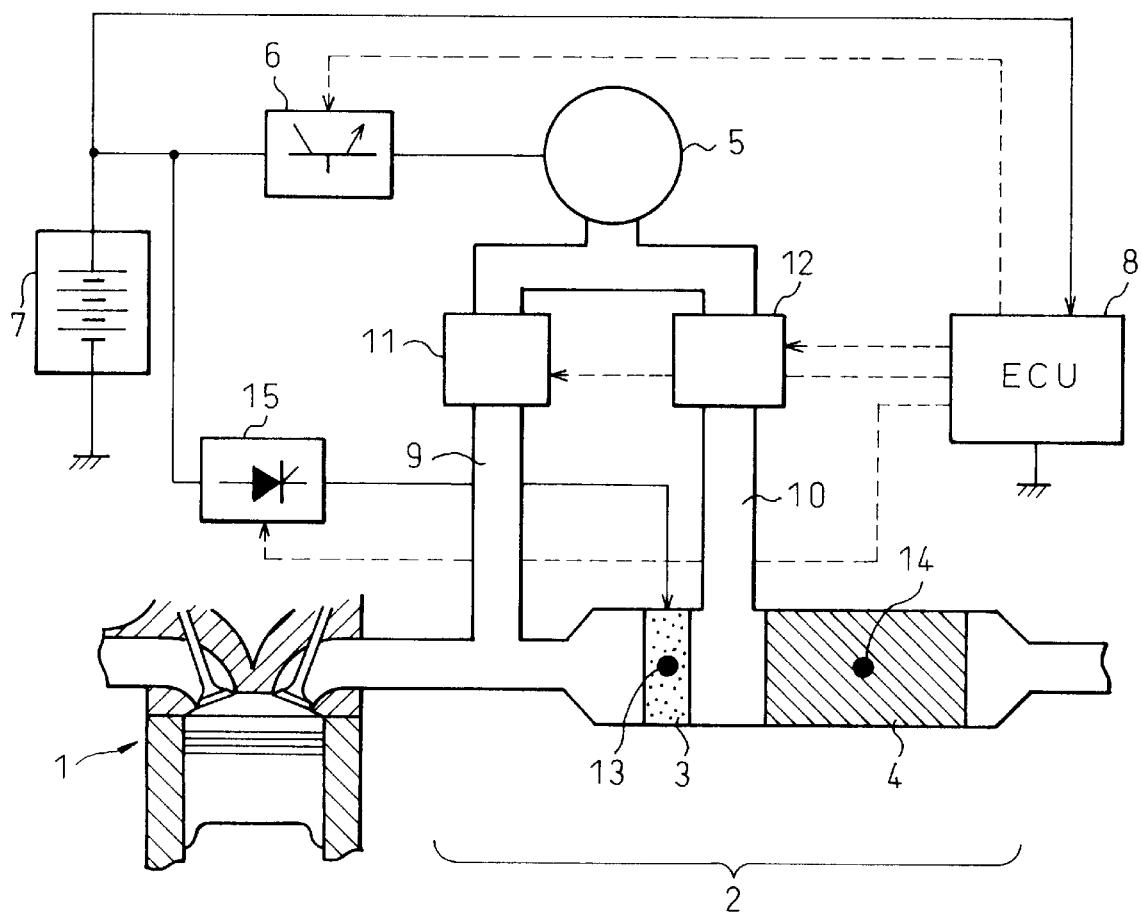
FIG. 3 shows an exhaust purifier according to a second embodiment of the present invention.

FIG. 3 shows an exhaust purifier according to the second embodiment of the present invention. An air pump 5 is connected to an exhaust pipe 2 through two paths. The other structure of the second embodiment is the same as that of the first embodiment. One of the two paths is a main path 10 similar to the first embodiment, and the other is a second path 9 for supplying secondary air from the air pump 5 to the upstream side of an electrically heated catalyst (EHC) 3 disposed in the exhaust pipe 2. The sectional area of the main path 10 is made larger than that of the second path 9 because more air is required to promote oxidation in the main catalyst 4 than to promote oxidation in the EHC 3. The main path 10 accommodates a main valve 12, which is opened by an electronic control unit 8, to supply secondary air from the air pump 5 into a space defined in the exhaust pipe 2 between the EHC 3 and the main catalyst 4. The second path 9 accommodates a second valve 11, which is opened by the control unit 8, to supply secondary air into the exhaust pipe 2 on the upstream side of the EHC 3. Accordingly, an output interface of the control unit 8 provides, in addition to the signals of the first embodiment, a signal to the second valve 11 to open or close the second path 9.

Figure 4:
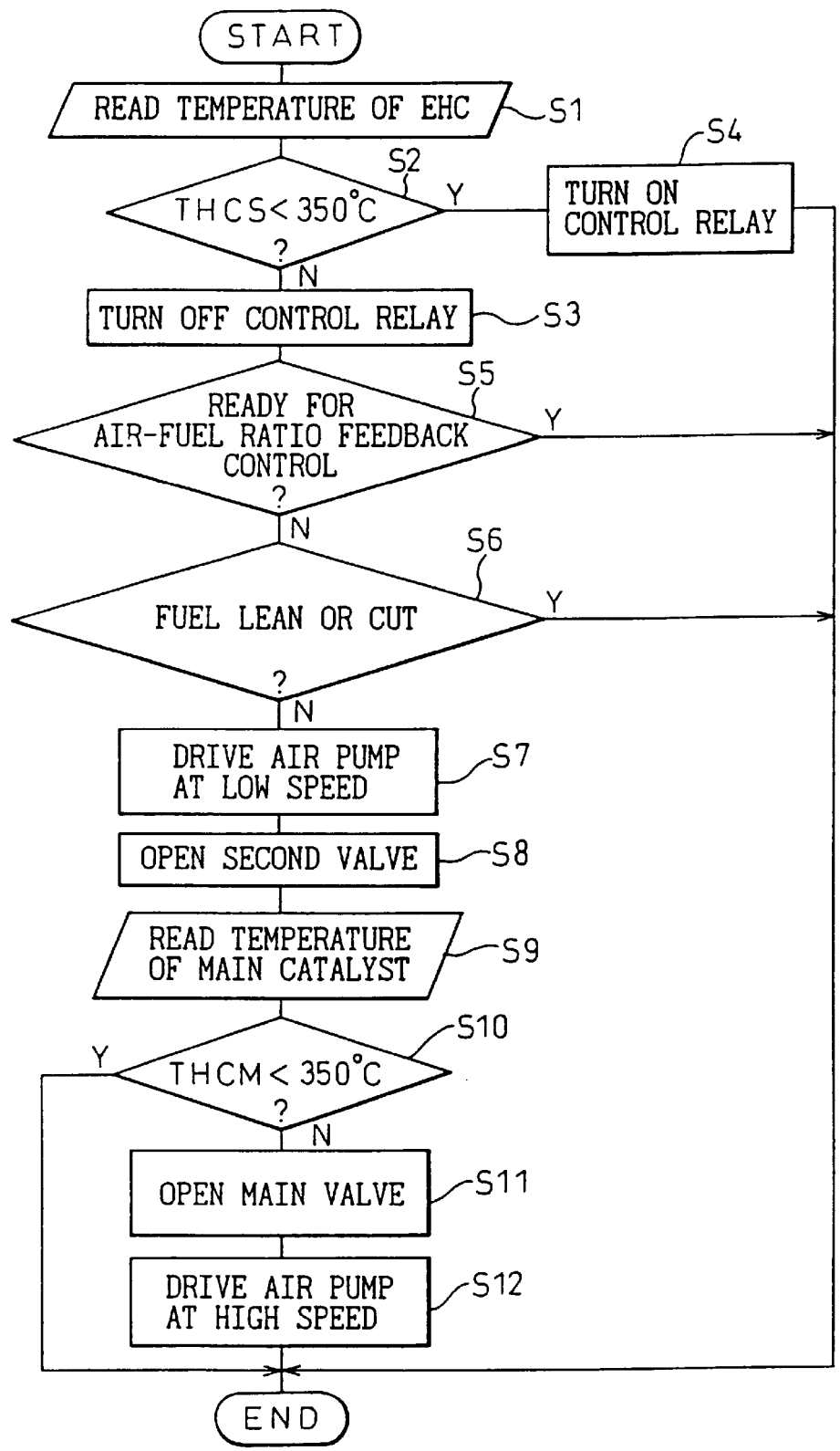
FIG. 4 is a flowchart showing a routine of controlling the exhaust purifier of the second embodiment.

FIG. 4 is a flowchart showing a routine for controlling the exhaust purifier of the second embodiment. The routine is carried out at intervals of 100 ms. Step S1 reads a temperature THCS of the EHC 3 through a temperature sensor 13. Step S2 compares the temperature THCS with the activation temperature of the EHC 3, for example, 350° C. If THCS≧350° C., step S3 is carried out, and if THCS<350° C., step S4 is carried out. Step S3 turns off a control relay 15. Step S4 turns on the control relay 15 to supply power from a battery 7 to the EHC 3.

Step S5 determines whether or not any one of the conditions (refer to the first embodiment) to start air-fuel ratio feedback control is met. If the feedback control must be started, the routine ends, and if not, step S6 is carried out. Step S6 determines whether or not fuel injection to the engine 1 is lean or cut. If fuel injection is lean or cut, the routine ends, and if not, step S7 is carried out. Secondary air must be stopped if the fuel injection is lean or cut, or the quantity of NOx will increase. Step S7 drives the air pump 5 at a low revolution speed of, for example, ½ to ⅓ of the maximum speed through a speed controller 6. Step S8 opens the second valve 11.

Step S9 reads a temperature THCM of the main catalyst 4 from a temperature sensor 14. Step S10 compares the temperature THCM with the activation temperature of the main catalyst 4, for example, 350° C. If THCM<350° C., the routine ends, and if THCM≧350° C., step S11 opens the main valve 12. Step S12 drives the air pump 5 at the maximum revolution speed through the speed controller 6.

FIG. 5 is a table showing the difference between the second embodiment and the prior art. The second embodiment differs from the prior art in that it has the main path 10 and main valve 12. The prior art has the second path 9 and second valve 11 and does not have the temperature sensors 13 and 14 for measuring the temperatures of the EHC and main catalyst. When the engine 1 is started from a cold state, the prior art turns on the control relay 15. After the EHC 3 is heated, or after the EHC 3 is activated, or just before the EHC 3 is activated, the prior art drives the air pump 5 and opens the second valve 11, to supply secondary air to the EHC 3 and main catalyst 4 through the second path 9. Once the catalysts are activated, the prior art turns off the control relay 15 to stop electricity to the EHC 3.

On the other hand, the second embodiment of FIG. 3 measures the temperature of the EHC 3 through the temperature sensor 13, to determine whether or not the EHC 3 is active. The second embodiment also measures the temperature of the main catalyst 4 through the temperature sensor 14, to determine whether or not the main catalyst 4 is active. The following three processes are taken depending on active states of the EHC 3 and main catalyst 4.

(i) If the EHC 3 and main catalyst 4 are both inactive, the second embodiment closes the second valve 11 and main valve 12 and stops the air pump 5.

(ii) If the EHC 3 is active and the main catalyst 4 is inactive, the second embodiment opens the second valve 11, closes the main valve 12, and drives the air pump 5 at a low speed.

(iii) If the EHC 3 and main catalyst 4 are both active, the second embodiment opens the second valve 11 and main valve 12 and drives the air pump 5 at a high speed.

Each of the above embodiments changes the quantity of secondary air from the air pump 5 into the exhaust pipe 2 by changing the revolution speed of the air pump 5 through the speed controller 6. The speed controller 6 may be a simple control relay, which is turned on/off to start/stop the air pump 5. The openings of the second valve 11 and main valve 12 may be changed in response to electric signals from the control unit 8, to change the quantity of secondary air supplied from the air pump 5 into the exhaust pipe 2.

As explained above, the first aspect of the present invention promotes the oxidation reaction of the main catalyst by supplying secondary air only to the main catalyst after the main catalyst is activated, so that the EHC may not be cooled by the secondary air and may remain active.

The second aspect of the present invention separately controls the quantity of secondary air supplied to the EHC and that supplied to the main catalyst, to promote the oxidation reaction of the two catalysts. As a result, the EHC is not cooled by the secondary air used to promote the oxidation reaction of the main catalyst and keeps active. The second aspect quickly activates the EHC and main catalyst and supplies a proper quantity of secondary air to the EHC and main catalyst, to optimize the exhaust purifying action of the EHC and main catalyst.

What is claimed is:

1. An exhaust purifier for an internal combustion engine, the exhaust purifier comprising an electrically heated catalyst (EHC) disposed in an exhaust pipe, a main catalyst disposed in the exhaust pipe downstream of the EHC, means for determining whether the main catalyst and the EHC are active and means for supplying secondary air into the exhaust pipe, wherein, when it is determined that both the EHC and the main catalyst are active, the secondary air supply means supplies secondary air to a portion of the exhaust pipe upstream of the EHC and to a space in the exhaust pipe between the EHC and the main catalyst and, when it is determined that the EHC is active and the main catalyst is inactive, the secondary air supply means supplies secondary air only to the portion of the exhaust pipe upstream of the EHC and stops the supply of secondary air to the space defined in the exhaust pipe between the EHC and the main catalyst, wherein a first quantity of air supplied by the secondary air supply means to the portion of the exhaust pipe upstream of the EHC is based on a quantity of air required to promote oxidation in the EHC and a second quantity of air supplied to the space in the exhaust pipe between the EHC and the main catalyst is based on a quantity of air required to promote oxidation in the main catalyst.

2. An exhaust purifier according to claim 1, wherein the secondary air supply means includes a first air passage coupled to the space defined within the exhaust pipe between the EHC and the main catalyst.

3. An exhaust purifier according to claim 1, wherein said determining means comprises a detector for detecting a current engine running condition and a controller for controlling the secondary air supply means based on the engine running condition.

4. An exhaust purifier according to claim 3, wherein the engine running condition detected is a condition which indicates that an air-fuel ratio feedback control mode of the engine will be started.

5. An exhaust purifier according to claim 4, wherein the detector detects an engine running condition selected from the following conditions: whether a predetermined time has elapsed since the engine was started; whether a quantity of fuel injected during a start-up time of the engine is increasing; whether an amount of power supplied to the EHC is increasing; and whether a temperature of a cooling water of the engine is less than a predetermined temperature.

6. An exhaust purifier according to claim 1, wherein said determining means comprises a detector for detecting whether a fuel injection to the engine is lean and a controller for controlling the secondary air supply means based on an output signal from the detector.

7. An exhaust purifier according to claim 1, wherein the second quantity of air is greater than the first quantity of air.

8. An exhaust purifier for an internal combustion engine, the exhaust purifier comprising an electrically heated catalyst (EHC) disposed in an exhaust pipe, a main catalyst disposed in the exhaust pipe downstream of the EHC, means for determining whether the main catalyst is active and for determining whether the EHC is active and means for supplying secondary air into the exhaust pipe, wherein, when it is determined that the main catalyst is active, the secondary air supply means supplies secondary air into a space defined in the exhaust pipe between the EHC and the main catalyst and, when it is determined that the EHC is active, the secondary air supply means supplies secondary air into the exhaust pipe on the upstream side of the EHC, so that the secondary air may pass through the EHC and the main catalyst.

9. An exhaust purifier according to claim 8, wherein the secondary air supply means includes a first path extending from a secondary air source to the space in the exhaust pipe defined between the EHC and the main catalyst and a second path extending from the secondary air source to a point in the exhaust pipe upstream of the EHC.

10. An exhaust purifier according to claim 9, wherein the secondary air supply means includes a first valve located within the first path for controlling the flow of secondary air to the space in the exhaust pipe defined between the EHC and the main catalyst and a second valve located within the second path for controlling the flow of secondary air to the point in the exhaust pipe upstream of the EHC.

11. A system for purifying exhaust from an internal combustion engine, the system comprising:

an electrically heated catalyst (EHC) disposed in an exhaust pipe;

a main catalyst disposed in the exhaust pipe downstream of the EHC;

means for determining whether the main catalyst is active;

a secondary air supply for supplying secondary air to the exhaust pipe; and a control unit coupled to the means for determining whether the main catalyst is active and to the secondary air supply for controlling operation of the secondary air supply so that, when it is determined that the main catalyst is active, the secondary air supply supplies a first quantity of secondary air to a portion of the exhaust pipe upstream of the EHC and supplies a second quantity of air to a space defined in the exhaust pipe between the EHC and the main catalyst and wherein the second quantity of air is greater than the first quantity of air.

12. The system according to claim 11, further comprising means for determining whether the EHC is active, wherein the control unit is coupled to the means for determining whether the EHC is active and wherein, when the EHC and the main catalyst are inactive, the control unit stops the supply of secondary air to the exhaust pipe and, when the EHC is active and the main catalyst is inactive, the control unit operates to supply secondary air to a portion of the exhaust pipe upstream of the EHC and stops the supply of secondary air to the space defined in the exhaust pipe between the EHC and the main catalyst.

13. The system according to claim 12, wherein the means for determining whether the main catalyst is active includes a temperature sensor for sensing a temperature of the main catalyst and wherein the means for determining whether the EHC is active includes a temperature sensor for sensing a temperature of the EHC.

14. The system according to claim 12, wherein the secondary air supply includes an air pump and, wherein the control unit controls the air pump so that, when the EHC and the main catalyst are inactive, the control unit stops the operation of the air pump and, when the EHC is active and the main catalyst is inactive, the control unit operates the air pump at a first speed and, when the EHC and the main catalyst are both active, the control unit operates the air pump at a second speed, higher than the first speed.

* * * * *